(12) United States Patent
Wiegel

(10) Patent No.: US 8,985,677 B2
(45) Date of Patent: Mar. 24, 2015

(54) VEHICLE FUEL ECONOMY SYSTEM

(71) Applicant: StormBlok Systems, Inc., Palmyra, NY (US)

(72) Inventor: J. Parr Wiegel, Palmyra, NY (US)

(73) Assignee: StormBlok Systems, Inc., Palmyra, NY (US)

( * ) Notice: Subject to any disclaimer, the term of this patent is extended or adjusted under 35 U.S.C. 154(b) by 0 days.

(21) Appl. No.: 13/839,662

(22) Filed: Mar. 15, 2013

(65) Prior Publication Data
US 2014/0125088 A1    May 8, 2014

Related U.S. Application Data

(60) Provisional application No. 61/723,506, filed on Nov. 7, 2012.

(51) Int. Cl.
*B62D 35/02* (2006.01)
*B62D 35/00* (2006.01)

(52) U.S. Cl.
CPC ........... *B62D 35/001* (2013.01); *Y10S 180/903* (2013.01)
USPC ...................................... 296/180.4; 180/903

(58) Field of Classification Search
CPC ................................ B62D 35/00; B62D 35/02
USPC .................................... 296/180.1, 180.4, 903
See application file for complete search history.

(56) References Cited

U.S. PATENT DOCUMENTS

| | | | |
|---|---|---|---|
| 2,737,411 | A | 3/1956 | Potter |
| 3,253,337 | A | 5/1966 | Ebert |
| 3,977,716 | A | 8/1976 | Whited |
| 4,142,755 | A | 3/1979 | Keedy |
| 4,418,853 | A | 12/1983 | Shaffer |
| 4,629,241 | A | 12/1986 | Gruich |
| 4,688,824 | A | 8/1987 | Herring |
| 4,746,160 | A | 5/1988 | Wiesemeyer |

(Continued)

FOREIGN PATENT DOCUMENTS

| | | |
|---|---|---|
| CA | 2583852 A1 | 10/2008 |
| DE | 3115742 A1 | 11/1982 |

(Continued)

OTHER PUBLICATIONS

International Search Report and Written Opinion of the International Searching Authority dated Feb. 24, 2014 8 pages.

(Continued)

*Primary Examiner* — Dennis H Pedder
(74) *Attorney, Agent, or Firm* — Brian B. Shaw, Esq.; Timothy W. Menasco, Esq.; Harter Secrest & Emery LLP

(57) ABSTRACT

A fairing assembly for a trailer having a wheel set and a hitch, the fairing assembly comprising a fairing connected to an underside of the trailer intermediate the hitch and the wheel set, the fairing including (i) a pair of opposing lateral surfaces separated by a distance, (ii) a bottom surface spaced from the underside of the trailer, and (iii) a leading surface, the leading surface substantially spanning the distance, wherein the leading surface includes an intake opening, wherein at least one of the bottom surface or the lateral surfaces includes an exit opening, and a flow path fluidly connects the intake opening and the exit opening.

19 Claims, 10 Drawing Sheets

(56) References Cited

U.S. PATENT DOCUMENTS

| | | |
|---|---|---|
| 4,877,266 A | 10/1989 | Lamparter et al. |
| 5,052,741 A | 10/1991 | Brown et al. |
| 5,080,397 A | 1/1992 | Metcalf |
| 5,137,296 A | 8/1992 | Forman |
| 5,232,234 A | 8/1993 | McCombs |
| 5,280,990 A | 1/1994 | Rinard |
| 5,314,201 A | 5/1994 | Wessels |
| 5,609,384 A | 3/1997 | Loewen |
| 5,921,617 A | 7/1999 | Loewen et al. |
| 6,092,861 A | 7/2000 | Whelan |
| 6,279,933 B1 | 8/2001 | Ross et al. |
| 6,286,894 B1 | 9/2001 | Kingham |
| 6,309,010 B1 | 10/2001 | Whitten |
| 6,409,252 B1 | 6/2002 | Andr |
| 6,457,833 B1 | 10/2002 | Ishikawa et al. |
| 6,595,578 B1 | 7/2003 | Calsoyds et al. |
| 6,644,720 B2 | 11/2003 | Long et al. |
| 6,666,498 B1 | 12/2003 | Whitten |
| 6,692,066 B2 * | 2/2004 | Fairburn et al. ............... 296/208 |
| 6,742,616 B2 | 6/2004 | Leban |
| 6,789,839 B1 | 9/2004 | Samuelson |
| 6,799,791 B2 | 10/2004 | Reiman et al. |
| 6,837,536 B1 | 1/2005 | Schwartz |
| 6,854,788 B1 | 2/2005 | Graham |
| 6,932,419 B1 | 8/2005 | McCullough |
| 6,959,958 B2 | 11/2005 | Basford |
| 6,974,178 B2 | 12/2005 | Ortega et al. |
| 6,986,544 B2 | 1/2006 | Wood |
| 7,008,005 B1 | 3/2006 | Graham |
| 7,093,889 B2 | 8/2006 | Graham |
| 7,147,270 B1 | 12/2006 | Andr et al. |
| 7,207,620 B2 | 4/2007 | Cosgrove et al. |
| 7,243,980 B2 | 7/2007 | Vala |
| 7,255,387 B2 | 8/2007 | Wood |
| 7,318,620 B2 | 1/2008 | Wood |
| 7,374,230 B2 | 5/2008 | Breidenbach |
| 7,380,868 B2 | 6/2008 | Breidenbach |
| 7,404,592 B2 | 7/2008 | Reiman et al. |
| 7,431,381 B2 | 10/2008 | Wood |
| 7,497,502 B2 | 3/2009 | Wood |
| 7,537,270 B2 | 5/2009 | O'Grady |
| 7,559,165 B2 | 7/2009 | Wiegel |
| 7,585,015 B2 | 9/2009 | Wood |
| 7,699,382 B2 | 4/2010 | Roush et al. |
| 7,726,724 B2 | 6/2010 | Kohls |
| 7,740,303 B2 | 6/2010 | Wood |
| 7,740,304 B1 | 6/2010 | Breu |
| 7,748,771 B2 | 7/2010 | Distel et al. |
| 7,748,772 B2 | 7/2010 | Boivin et al. |
| 7,780,224 B2 * | 8/2010 | Roush ..................... 296/180.4 |
| 7,784,854 B2 | 8/2010 | Breidenbach |
| 7,806,464 B2 | 10/2010 | Cardolle |
| 7,837,254 B2 | 11/2010 | Reiman et al. |
| 7,845,708 B2 * | 12/2010 | Breidenbach ............... 296/180.4 |
| 7,850,224 B2 | 12/2010 | Breidenbach |
| 7,854,468 B2 | 12/2010 | Vogel et al. |
| 7,857,376 B2 | 12/2010 | Breidenbach |
| 7,866,734 B2 | 1/2011 | Mracek |
| 7,887,120 B2 | 2/2011 | Boivin et al. |
| 7,938,475 B2 | 5/2011 | Boivin et al. |
| 7,942,466 B2 | 5/2011 | Reiman et al. |
| 7,942,467 B2 | 5/2011 | Boivin et al. |
| 7,942,468 B2 | 5/2011 | Boivin et al. |
| 7,942,469 B2 | 5/2011 | Boivin et al. |
| 7,942,470 B2 | 5/2011 | Boivin et al. |
| 7,942,471 B2 | 5/2011 | Boivin et al. |
| 7,950,721 B1 | 5/2011 | Peterson |
| 7,976,096 B2 | 7/2011 | Holubar |
| 7,992,666 B2 | 8/2011 | Otterstrom |
| 8,007,030 B2 | 8/2011 | Wood |
| 8,025,329 B1 | 9/2011 | Kron |
| 8,025,330 B2 | 9/2011 | Reiman et al. |
| 8,079,634 B2 | 12/2011 | Visser et al. |
| 8,087,715 B2 | 1/2012 | Andr et al. |
| 8,100,461 B2 | 1/2012 | Smith et al. |
| 8,162,381 B2 | 4/2012 | Tertnes |
| 8,162,384 B2 | 4/2012 | Giromini et al. |
| 8,177,286 B2 | 5/2012 | Brown et al. |
| 8,177,287 B2 | 5/2012 | Vogel et al. |
| 8,186,745 B2 | 5/2012 | Graham et al. |
| 8,191,956 B1 | 6/2012 | Dixon, Jr. et al. |
| 8,210,599 B2 | 7/2012 | Butler |
| 8,251,436 B2 | 8/2012 | Henderson et al. |
| 8,267,211 B2 | 9/2012 | Otterstrom |
| 8,272,680 B2 | 9/2012 | Breidenbach |
| 8,276,972 B2 * | 10/2012 | Domo et al. ............... 296/180.1 |
| 8,287,030 B2 | 10/2012 | Ryan et al. |
| 8,292,351 B2 | 10/2012 | Boivin et al. |
| 8,303,025 B2 | 11/2012 | Senatro |
| 8,322,778 B1 | 12/2012 | Pfaff |
| 8,360,509 B2 | 1/2013 | Smith et al. |
| 8,360,510 B2 | 1/2013 | Smith et al. |
| 8,376,450 B1 * | 2/2013 | Long et al. ............... 296/180.4 |
| 2002/0021023 A1 | 2/2002 | Leban |
| 2002/0030384 A1 | 3/2002 | Basford |
| 2003/0057736 A1 | 3/2003 | Long et al. |
| 2003/0205913 A1 | 11/2003 | Leonard |
| 2004/0119319 A1 | 6/2004 | Reiman et al. |
| 2004/0256884 A1 | 12/2004 | Schwartz |
| 2005/0146161 A1 | 7/2005 | Uland |
| 2005/0161976 A1 | 7/2005 | Ortega et al. |
| 2005/0168012 A1 | 8/2005 | Ortega et al. |
| 2006/0049665 A1 | 3/2006 | Graham |
| 2006/0152038 A1 | 7/2006 | Graham |
| 2007/0001481 A1 | 1/2007 | Breidenbach |
| 2007/0046066 A1 | 3/2007 | Cosgrove et al. |
| 2007/0120397 A1 | 5/2007 | Layfield et al. |
| 2007/0126261 A1 | 6/2007 | Breidenbach |
| 2008/0048468 A1 | 2/2008 | Holubar |
| 2008/0061597 A1 | 3/2008 | Reiman et al. |
| 2008/0061598 A1 | 3/2008 | Reiman et al. |
| 2008/0093887 A1 | 4/2008 | Wood |
| 2008/0157560 A1 | 7/2008 | Spector |
| 2008/0164722 A1 | 7/2008 | Breidenbach |
| 2008/0303311 A1 | 12/2008 | Roush |
| 2008/0309122 A1 | 12/2008 | Smith et al. |
| 2009/0096250 A1 | 4/2009 | Kohls |
| 2009/0140542 A1 | 6/2009 | Breidenbach |
| 2009/0146453 A1 * | 6/2009 | Ortega et al. ............... 296/180.4 |
| 2009/0179456 A1 | 7/2009 | Holubar |
| 2009/0189414 A1 | 7/2009 | Boivin et al. |
| 2009/0200834 A1 | 8/2009 | Vogel et al. |
| 2009/0212594 A1 | 8/2009 | Breidenbach |
| 2009/0212595 A1 | 8/2009 | Heppel |
| 2009/0212596 A1 | 8/2009 | Reiman et al. |
| 2009/0230726 A1 | 9/2009 | Reiman et al. |
| 2010/0066123 A1 | 3/2010 | Ortega et al. |
| 2010/0096880 A1 | 4/2010 | Boivin et al. |
| 2010/0096881 A1 | 4/2010 | Boivin et al. |
| 2010/0096882 A1 | 4/2010 | Boivin et al. |
| 2010/0096883 A1 | 4/2010 | Boivin et al. |
| 2010/0117396 A1 | 5/2010 | Dayton |
| 2010/0123333 A1 | 5/2010 | Breidenbach |
| 2010/0181799 A1 | 7/2010 | Ryan et al. |
| 2010/0264690 A1 | 10/2010 | Brown et al. |
| 2011/0025092 A1 | 2/2011 | Reiman et al. |
| 2011/0068603 A1 | 3/2011 | Domo et al. |
| 2011/0068605 A1 | 3/2011 | Domo et al. |
| 2011/0084516 A1 | 4/2011 | Smith et al. |
| 2011/0084517 A1 | 4/2011 | Vogel et al. |
| 2011/0101730 A1 | 5/2011 | Tertnes |
| 2011/0175393 A1 | 7/2011 | Cline |
| 2011/0175394 A1 | 7/2011 | Breidenbach |
| 2011/0175396 A1 | 7/2011 | Boivin et al. |
| 2011/0204677 A1 | 8/2011 | Wood |
| 2011/0210578 A1 | 9/2011 | Breidenbach |
| 2011/0221231 A1 | 9/2011 | Visser et al. |
| 2011/0233960 A1 | 9/2011 | Heinz |
| 2011/0272964 A1 | 11/2011 | Henderson et al. |
| 2011/0285167 A1 | 11/2011 | Butler |
| 2011/0304173 A1 | 12/2011 | Breidenbach |
| 2012/0001451 A1 | 1/2012 | Breidenbach |
| 2012/0032475 A1 | 2/2012 | Grandominico et al. |
| 2012/0074728 A1 | 3/2012 | Senatro |

(56) References Cited

U.S. PATENT DOCUMENTS

| 2012/0086233 A1 | 4/2012 | Visser et al. |
| 2012/0086234 A1 | 4/2012 | Visser et al. |
| 2012/0091754 A1 | 4/2012 | Lee et al. |
| 2012/0104791 A1 | 5/2012 | Visentin |
| 2012/0104792 A1 | 5/2012 | Smith et al. |
| 2012/0119540 A1 | 5/2012 | Breidenbach |
| 2012/0126572 A1 | 5/2012 | Hjelm et al. |
| 2012/0153668 A1 | 6/2012 | van Raemdonck |
| 2012/0200113 A1 | 8/2012 | Brown et al. |
| 2012/0261945 A1 | 10/2012 | Litchfield |
| 2012/0299330 A1 | 11/2012 | Breidenbach |
| 2013/0106135 A1* | 5/2013 | Praskovsky et al. ....... 296/180.1 |
| 2013/0127204 A1* | 5/2013 | Johnson et al. ............ 296/180.4 |

FOREIGN PATENT DOCUMENTS

| EP | 51093 A1 | 5/1982 |
| EP | 2206639 A1 | 7/2010 |
| FR | 2623155 A1 | 5/1989 |
| GB | 2063799 A | 6/1981 |
| GB | 2065047 B | 6/1981 |
| WO | 9748590 A1 | 12/1997 |
| WO | 2008024386 A2 | 2/2008 |
| WO | 2008033725 A2 | 3/2008 |
| WO | 2008124573 B1 | 10/2008 |
| WO | 2008144025 A2 | 11/2008 |
| WO | 2009022904 A1 | 2/2009 |
| WO | 2009105623 A1 | 8/2009 |
| WO | 2010026442 A1 | 3/2010 |
| WO | 2010053409 A1 | 5/2010 |

OTHER PUBLICATIONS

Ihlein et al.: "Truckin" on Drag Coefficients of Tractor Trailer Trucks, May 2, 2007 17 pages.
Reducing Aerodynamic Drag on Heavy Trucks: Lawrence Livermore National Laboratory http://techportal.eere.energy.gov/technology.do/techID+507 (Dec. 14, 2012) 3 pages.
Quain: Stretching Trucks' Mileage—The New York Times article http://www.nytimes.com/2012/12/20/automobiles/stretching-trucks-mileage.html? . . . 2 pages.
On Aerodynamics: The Effect of Aerodynamics on Tractor Trailers, dated Apr. 16, 2013 (2 pages) http://freightwing.com/on-aerodynamics.php.
Thomson Patent Search Report.

* cited by examiner

VEHICLE FUEL ECONOMY SYSTEM

CROSS-REFERENCE TO RELATED APPLICATIONS

This application claims the benefit of U.S. Provisional Application No. 61/723,506, filed Nov. 7, 2012.

STATEMENT REGARDING FEDERALLY SPONSORED RESEARCH OR DEVELOPMENT

None.

REFERENCE TO A "SEQUENCE LISTING"

None.

FIELD OF THE INVENTION

The present invention relates generally to drag force reduction systems. More specifically, the present invention relates to an apparatus for reducing a drag force of a trailer.

BACKGROUND OF THE INVENTION

Most of today's tractor-trailers get about 6-7 mpg of fuel leaving significant potential for improving fuel economy of tractor-trailers. Reducing the fuel consumption of tractor-trailers would directly impact transportation costs of goods, serving businesses and consumers alike.

Fuel consumption of a tractor-trailer is influenced by the amount of drag forces incurred by the vehicle while traveling. As the drag forces increase, fuel consumption also increases. One area of a trailer where drag forces are high is the undercarriage of a trailer. When the tractor-trailer is traveling, air flows under the trailer, placing significant drag forces on the wheels and undercarriage. The tractor-trailer must use more power to overcome the drag, thereby increasing fuel consumption. Thus, it is most desirable to reduce drag beneath the undercarriage of a trailer.

What is needed then is a drag reduction system for a trailer that improves fuel economy.

It would, therefore, be desirable to provide a drag reduction system for a trailer that overcomes the aforesaid and other disadvantages.

SUMMARY OF THE INVENTION

In one configuration, a drag force reduction system for a trailer having an underside, a hitch, and a wheel set, comprises a frame connected to the underside of the trailer intermediate the hitch and wheel set, the frame having a front portion, a back portion, a bottom portion and two opposing lateral sides, and a skin enclosing at least one portion of the frame.

In another configuration, a fairing assembly for a trailer having a wheel set and a hitch, comprises a fairing connected to an underside of the trailer intermediate the hitch and the wheel set, the fairing including: (i) a pair of opposing lateral surfaces separated by a certain width, (ii) a bottom surface spaced from the underside of the trailer, and (iii) a leading surface. The leading surface substantially spans the width between the opposing lateral surfaces. The leading surface includes an intake opening, wherein at least one of the bottom surface or the lateral surfaces includes an exit opening, and a flow path fluidly connecting the intake opening and the exit-opening.

In one configuration, the leading surface includes first and second venting ducts extending from the intake opening in the leading surface to the exit-opening in each corresponding lateral surface, wherein aft exiting the exit-openings reduces a pressure on an outside surface of the fairing.

In another configuration, the leading surface includes first and second venting ducts extending from the intake opening in the leading surface to a corresponding exit-opening in the bottom surface, wherein aft exiting the exit-openings reduces a pressure on at least one of the bottom surface of the fairing, and the lateral surface.

In yet another configuration, the drag force reduction system further comprises a back unit for mounting to a back planar surface of the trailer, the back unit having first and second frames formed of a plurality of struts, each frame having a base portion arranged proximate the back planar surface of the trailer and a protruding portion of the frame arranged distal to the back planar surface of the trailer, wherein the base portion of the first frame circumscribes a first portion of the back planar surface of the trailer and wherein the base portion of the second frame circumscribes a second portion of the back planar surface of the trailer, and a material substantially enclosing the back unit frames.

BRIEF DESCRIPTION OF THE SEVERAL VIEWS OF THE DRAWING(S)

The foregoing features of this invention, as well as the invention itself, may be more fully understood from the following description of the drawings in which.

DETAILED DESCRIPTION OF THE INVENTION

At the outset, it should be appreciated that like drawing numbers on different drawing views identify identical structural elements of the invention. While the present invention is described with respect to what is presently considered to be the preferred embodiment, it is understood that the invention is not limited to the disclosed embodiment.

Furthermore, it is understood that the invention is not limited to the particular methodology, materials, and modifications described and as such may vary. It is also understood that the terminology used herein is for the purpose of describing particular elements only, and is not intended to limit the scope of the present invention, which is limited only by the appended claims.

The drag force reduction system increases fuel economy for tractor trailer trucks, straight trucks, cargo carriers, school buses and the like by reducing drag under the vehicle and off the back of the vehicle.

Figure 1:
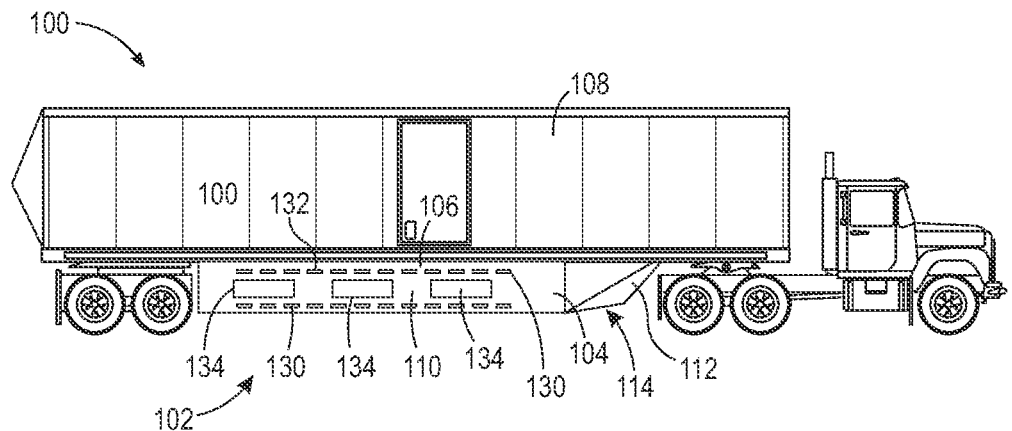
FIG. 1 is a side view of a truck having a drag reduction system including a fairing and a back unit installed on the truck.
Figure 19:
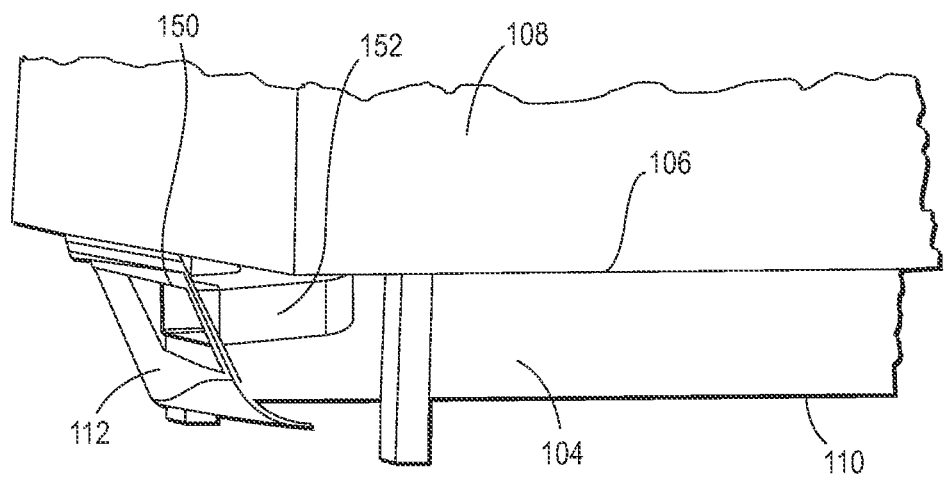
FIG. 19 is a side view of a one piece design of a fairing assembly mounted to the undercarriage of a truck, wherein the non-visible portion is a mirror image integrally fixed with the shown portion.
Figure 20:
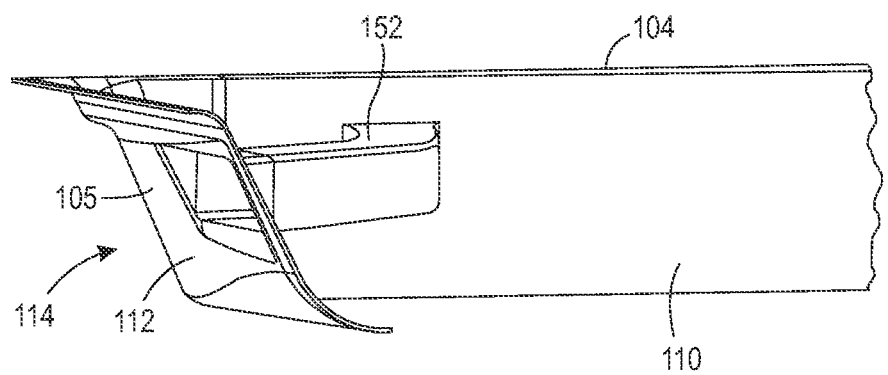
FIG. 20 is a side view of the one piece design of a fairing assembly not mounted to the undercarriage of a truck, wherein the non-visible portion is a mirror image integrally fixed with the shown portion.

In one configuration, as shown in FIGS. 1, 19 and 20, the drag force reduction system 100 is a fairing assembly 102 for a trailer having a wheel set and a hitch. The fairing assembly 102 comprises a fairing 104 connected to an underside 106 of the trailer 108 intermediate the hitch and the wheel set. The fairing 104 includes a pair of opposing lateral surfaces 110 (separated by a distance that is substantially equal to the width of the trailer. The distance can vary in width depending on the trailer size, design, and to maximize the aerodynamic advantage of the system. By "substantially equal to the width of the trailer," it is meant that the opposing lateral surfaces 110 are spaced inwardly from the perimeter side edge of the trailer 108 by approximately zero to twenty-four (24) inches and more preferably between zero and eight (8) inches. Alternatively, all or a portion of the lateral surfaces may protrude approximately zero to four (4) inches from the outer perimeter side edge of the trailer. The fairing 104 further includes a leading surface 112 substantially spanning the distance between the opposing lateral surfaces 110.

The leading surface 112 defines a bow 114 and reduces a drag coefficient of the fairing assembly 102. In one configuration, the bow 114 is formed of two integrally connected panels 103, 105. The panels 103, 105 may each include an upper lip 109 extending forward from the bow 114 and a sidewall 107 integrally connected to a corresponding edge of the lateral surface 110.

It should be appreciated by those having ordinary skill in the art that the "drag coefficient" or $C_d$ is the quantity that describes a characteristic amount of aerodynamic drag, which is used in the drag equation:

$$F_d = \frac{1}{2} C_d \rho v^2 A$$

The drag force, $F_d$, is proportional to the drag coefficient number, $C_d$. Thus, reducing the drag force coefficient by adding the fairing assembly 102 can reduce the drag force. It should be appreciated that other dimensionless force and moment coefficients may be reduced as well. The fairing assembly 102 can be configured to reduce at least one of the following force and moment coefficients by at least 5%, preferably by at least 20% and more preferably by at least 50%:

$$C_n = \frac{N}{1/2\, \rho v^2 A} \text{(Normal Force Coefficient)}$$

$$C_{ax} = \frac{A_x}{1/2\, \rho v^2 A} \text{(Axial Force Coefficient)}$$

$$C_s = \frac{S}{1/2\, \rho v^2 A} \text{(Side Force Coefficient)}$$

$$C_{pm} = \frac{M_p}{1/2\, \rho v^2 AL} \text{(Pitching Moment Coefficient)}$$

$$C_{rm} = \frac{M_r}{1/2\, \rho v^2 AL} \text{(Rolling Moment Coefficient)}$$

$$C_{ym} = \frac{M_y}{1/2\, \rho v^2 AL} \text{(Yawing Moment Coefficient)}$$

Figure 18:
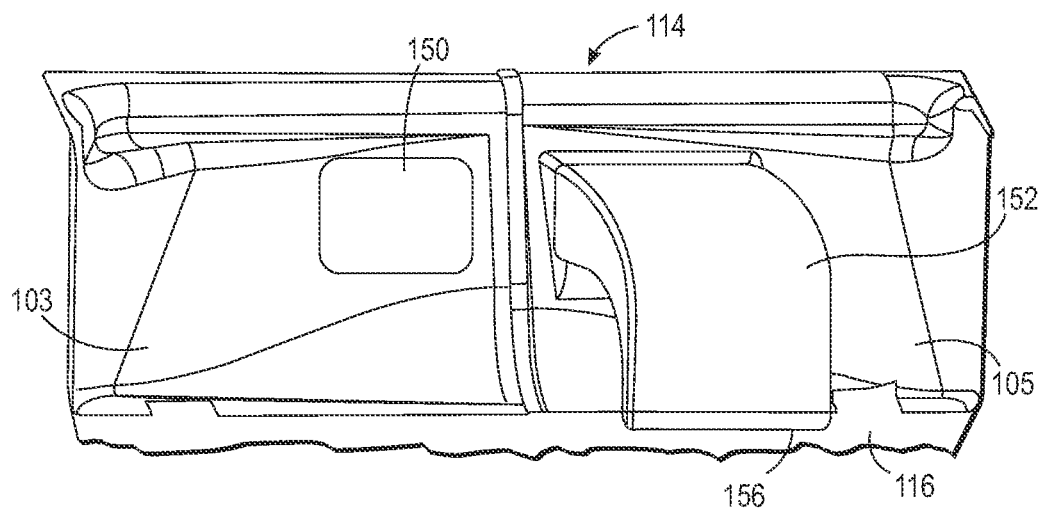
FIG. 18 is a back view of the bow, wherein the first portion of the bow includes a venting duct and a second portion of the bow includes an opening for a venting duct that is not shown.
Figure 21:
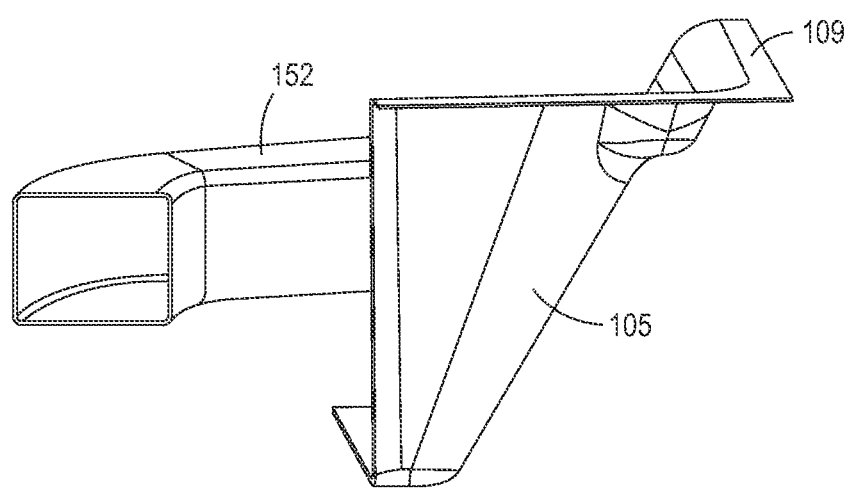
FIG. 21 is a side view of the first bow portion of the drag reduction system showing the venting duct fluidly connected to the intake opening in the bow and arranged to exit an opening in a lateral side (not shown).

As shown in FIGS. 16-21, in one configuration, the leading surface 112 is formed of two flat, half-bulbous, or slightly-curved panels 103, 105. The leading surface 112 may include at least one intake opening 150 having a diameter range of approximately six inches to approximately four feet. In one configuration, as shown in, for example, FIG. 18, the leading surface 112 includes two intake openings 150 spaced approximately at least one foot apart from each other for a 45-53 foot trailer. The openings 150 may include a venting duct 152 fluidly coupling each intake opening 150 to either an exit-opening 154 in the bottom surface 116 or an exit-opening 156 in each of the lateral surfaces 110. In one configuration, the exit-openings 154 or 156 have a cross-sectional area that is less than a cross-sectional area of the intake opening 150. In another configuration, the exit-openings 154 or 156 have a cross-sectional area that is equal to a cross-sectional area of the intake opening 150. When a tractor-trailer is traveling, the air follows a flow path through intake opening(s) 150 in the leading surface 112, through the venting duct(s) 152 and either out the exit-opening(s) 154 in the bottom surface 116 as shown in FIG. 18 (shown without the bottom surface 116) reducing pressure and drag from the bottom surface 116 and along the lateral surfaces 110, or, out the exit-openings 156 in each of the lateral surfaces 110, as shown in FIGS. 19-21, reducing pressure and drag on the lateral surfaces 110.

The bow 114 may be flat, curved, bulbous, arched, or angled, have a high or low chin, and may have any of the following shapes: tumblehome, plumb, raked, spoon, etc. Further, the bow 114 may be curved or bulbous in the center and substantially flat along the remaining surface. The position of the bow 114 on the underside 106 of a trailer 108 can be adjusted according to the vehicle or truck type and the load type. The lateral surfaces 110 may be planar or may have at least one of a convex and concave portion.

In one configuration, the fairing 104 can include a bottom surface 116 spaced from the underside 106 of the trailer 108. The bottom surface 116 spans an area bounded by the lateral surfaces 110 and the leading surface 112.

Figure 3:
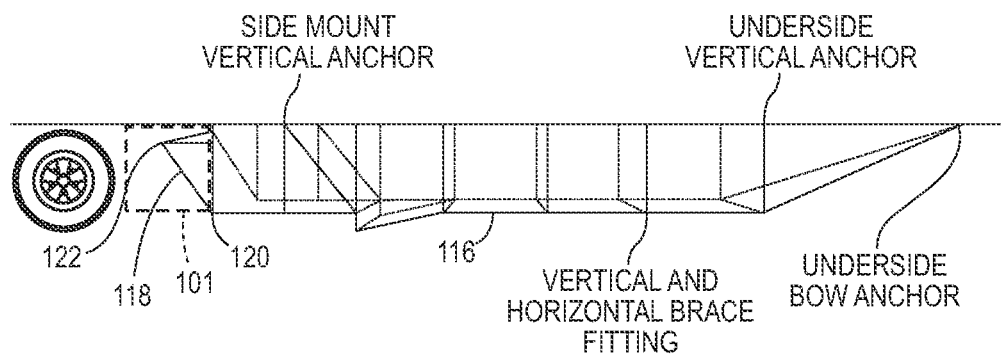
FIG. 3 is a right side view of the fairing including a back panel shown in phantom to illustrate the trailing surface.

In another configuration, as shown in FIG. 3, the fairing 104 includes a trailing surface 118 spaced from the underside 106 of the trailer 108, the trailing surface 118 substantially spanning the distance between the opposing lateral surfaces 110. Back panel 101 is shown in phantom so that trailing surface 118 can be seen. The trailing surface 118 is spaced from the wheel set and lowers the drag coefficient of the fairing assembly 102. The trailing surface 118 extends from a first position 120 spaced from the underside 106 of the trailer 108 to a second position 122 adjacent the underside 106 of the trailer 108. The second position 122 is intermediate the wheel set and the first position 120 such that the trailing surface 118 is angled. The second position 122 of the trailing surface 118 may be between one (1) inch and eighteen (18) inches from the underside of the trailer 108 and more preferably between two (2) and nine (9) inches. The bottom surface 116 and the trailing surface 118 substantially enclose a volume beneath the trailer 108. By "substantially encloses" it is meant that at least seventy percent (70%) of the undercarriage 106 between the hitch and wheel set is enclosed by the fairing assembly 102.

The fairing 104 may also include a plurality of lighting elements 130 (also referred to herein as lights) disposed along the lateral surfaces 110 or a portion thereof. In one configuration, the lights 130 are disposed along the perimeter edge 132 of the lateral surfaces 110. It should be appreciated that by illuminating the lateral surfaces 110 of the fairing 104, road safety is improved by making the trailer portion of the tractor-trailer more visible. Further, the lights 130 can be used to illuminate the lateral surfaces 110 and/or panels 134 located on the lateral surfaces 110, the lateral surfaces 110 and/or panels 134 having marketing indicia, logos or other advertising features.

Figure 2:
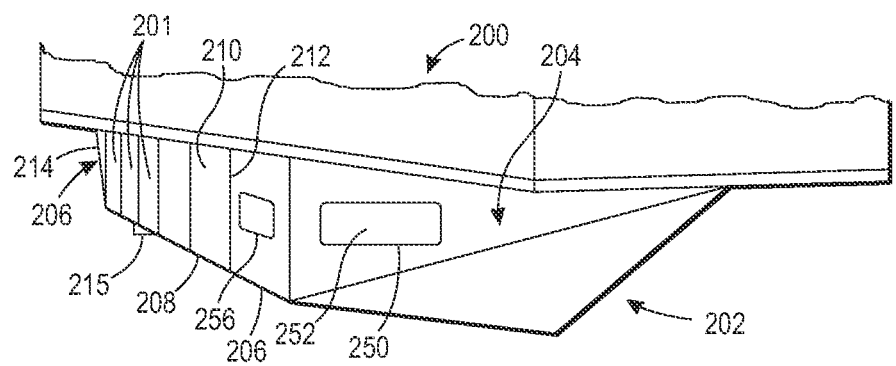
FIG. 2 is a perspective view of the lower frame having a frame and side panels.

In another configuration, as shown in FIGS. 2 and 3, the drag force reduction system 100 includes a frame 200 connected to the underside 106 of a trailer 108 and a skin 202 enclosing at least one portion of the frame 200. The frame 200 is sized to be intermediate the hitch and wheel set of a trailer 108. The position of the frame 200 on the underside 106 of a trailer 108 can be adjusted according to the vehicle or truck type and the load type.

The frame 200 includes a front portion 204, a back portion 206, a bottom portion 208 and two opposing side portions 210 formed by sets of struts 212. In one embodiment, the struts are metal, plastic or PVC. The side portions 210 are spaced at a distance that is substantially equal to the width of the trailer. The back portion 206 is spaced from the wheel set of the trailer 108 and includes a top edge 214. In one configuration, the top edge 214 is spaced from the underside 106 of the trailer 108. For example, the back portion 206 may be spaced between two and nine inches from the underside 106 of the trailer 108. Preferably, the space is approximately six inches. The back portion 206 of the frame 200 extends at an obtuse angle relative to the bottom portion 208.

The frame 200 can have interconnecting modular sections. Preferably, the modular sections are approximately 1 foot to 20 feet wide. More preferably, the modular portions are approximately 2 feet to 10 feet wide. The side portions 210 may be planar or may have at least one of a convex and concave portion. The drag force reduction system 100 may further comprise aerodynamic fin portions 215 extending from the side portions 210 of the frame 200.

The skin 202 encloses at least one portion of the frame 200 reducing a drag coefficient of the system. In one configuration, the skin 202 substantially encloses the front portion 204, the side portions 210 and the bottom portion 208 of the frame 200. In another configuration, the skin 202 substantially encloses the back portion 206 of the frame 200. The skin 202 may be made from one or more than one of the following: polycarbonate, ABS plastic, metal, rubber, fabric and polyurethane.

In a configuration of the invention, the frame 200 is modular and can be used as a storage system, wherein any singular modular portion 201 is enclosed and includes a resealable access port (not shown) or wherein multiple modular portions are enclosed to form one storage area which includes a resealable access port (not shown).

The front portion 204 may include at least one intake opening 250. In one configuration, the front portion 204 includes two intake openings 250 spaced at least approximately 1 foot apart from each other on a 45-53 foot trailer. The openings 250 may include a venting duct 252 fluidly coupling each intake opening 250 to either an exit-opening in the bottom portion 208 or an exit-opening 256 in each of the opposing side portions 210. When a tractor-trailer is traveling, the air follows a flow path through intake opening(s) 250 in the front portion 204, through the venting duct(s) 252 and either out the exit-opening(s) 254 in the bottom portion 208 reducing pressure and drag from the bottom portion 208 and along the side portions 210 or out the exit-openings 256 in each of the side portions 210 reducing pressure and drag on the side portions 210.

As shown in FIGS. 5-15, the drag reduction system may include a back unit 300 for mounting to a back planar surface of the trailer 108. The back unit 300 includes either one frame 302 or two half-frames (also referred to herein as first and second frames) 304 that together circumscribe a back planar surface of the trailer 108. The frame 302 or half-frames 304 are formed of a plurality of struts 306 and include a base portion 308. In the one frame configuration, the frame 302 is approximately pyramidal. In the one frame 302 configuration, the frame 302 includes a base portion 308 arranged proximate the back planar surface of the trailer 108 and a protruding portion 310 arranged distal to the back planar surface of the trailer 108. The first and second frames 304 can each form approximately ½ of a pyramid. The base portion 308 of the one of the half-frames 302 circumscribes approximately half of the back planar surface of the trailer and the base portion of the second frame circumscribes approximately the other half of the back planar surface of the trailer 108.

Figure 9:
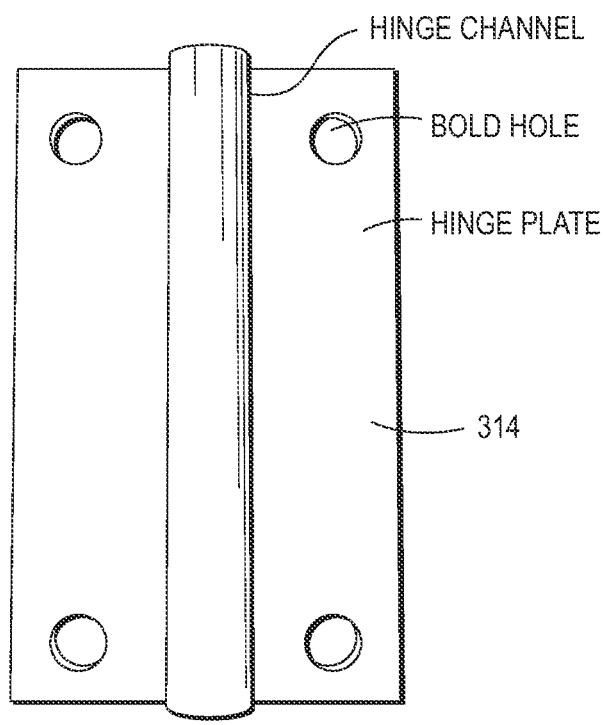
FIG. 9 is a front view of a hinge plate for receiving a strut portion of the back unit.
Figure 10:
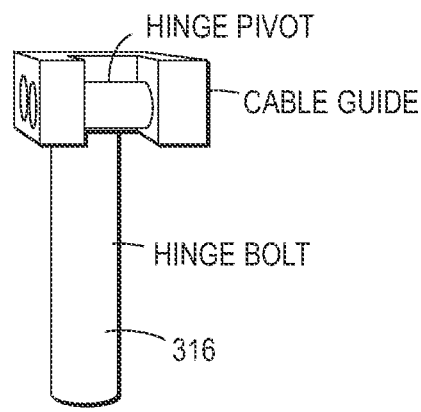
FIG. 10 is a partial perspective view of a strut that inserts into the hinge plate.
Figure 11:
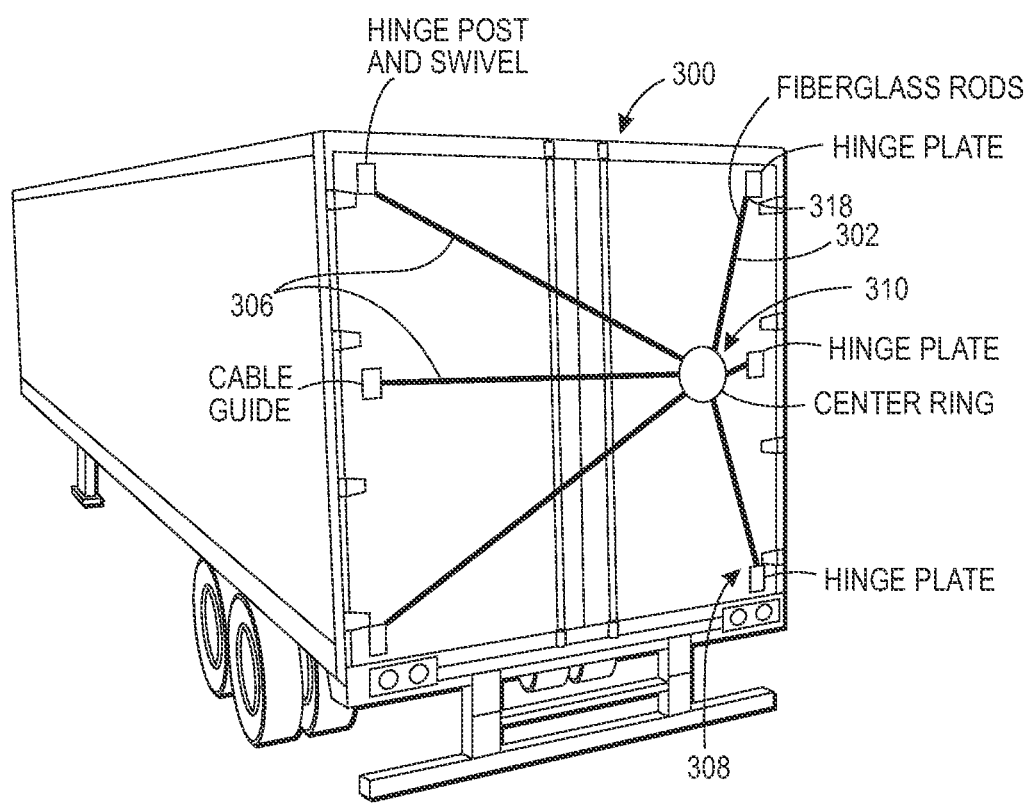
FIG. 11 is a perspective view of the back of a truck showing the position of the hinge plates, cable guide, struts and apex plate.
Figure 12:
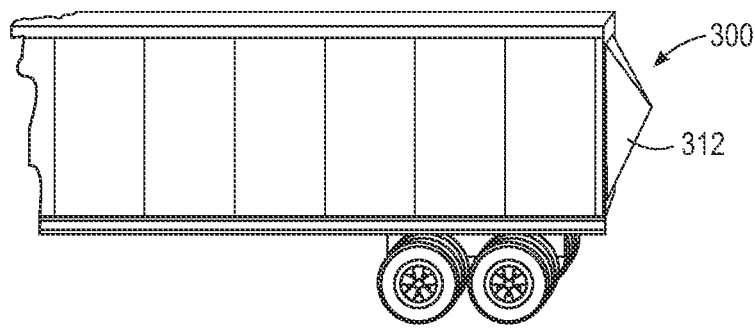
FIG. 12 is a side view of a truck having a back unit installed.
Figure 13:
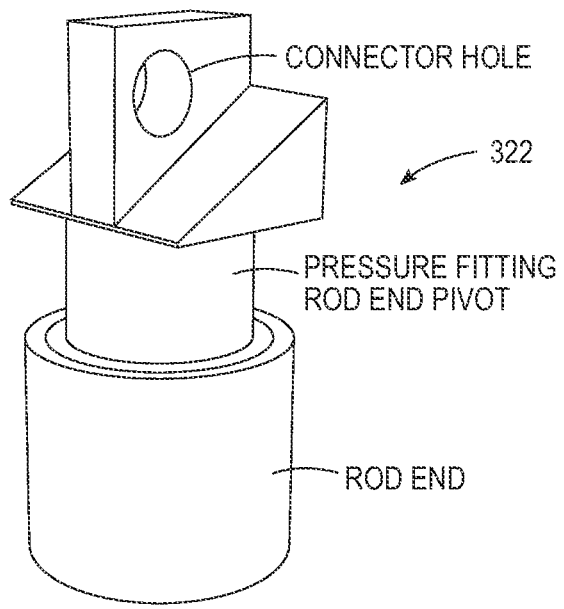
FIG. 13 is a perspective view of a swiveling connector for coupling the plurality of struts to the anchors.
Figure 14:
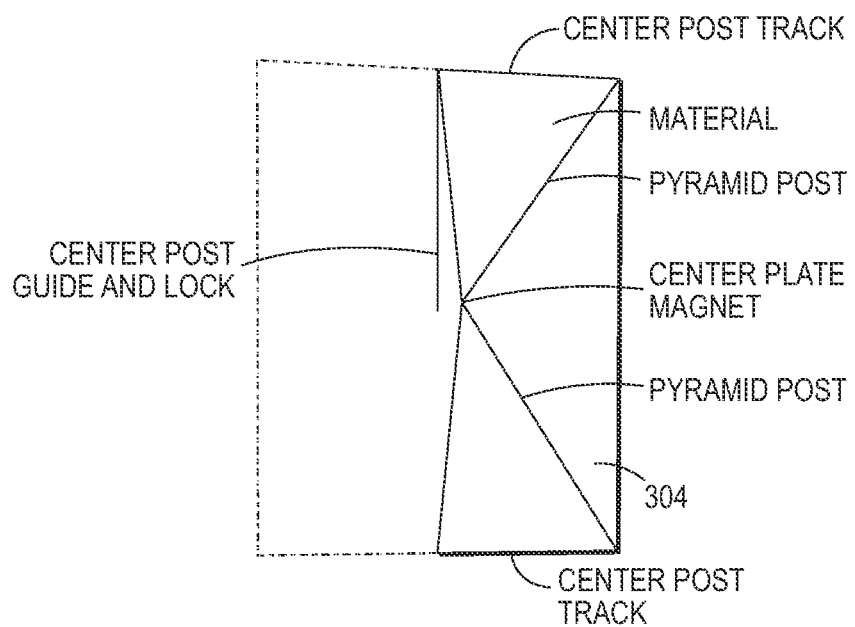
FIG. 14 is a front view of one of the frames of the back unit.
Figure 15:
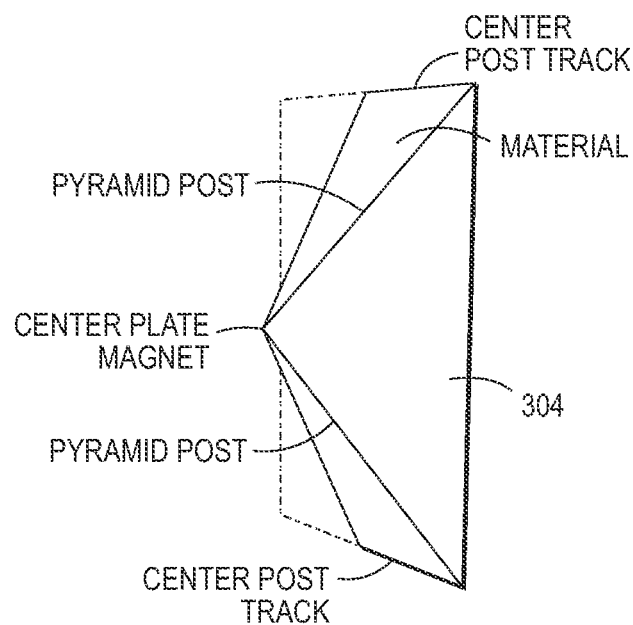
FIG. 15 is a perspective view of one of the frames of the back unit.
Figure 16:
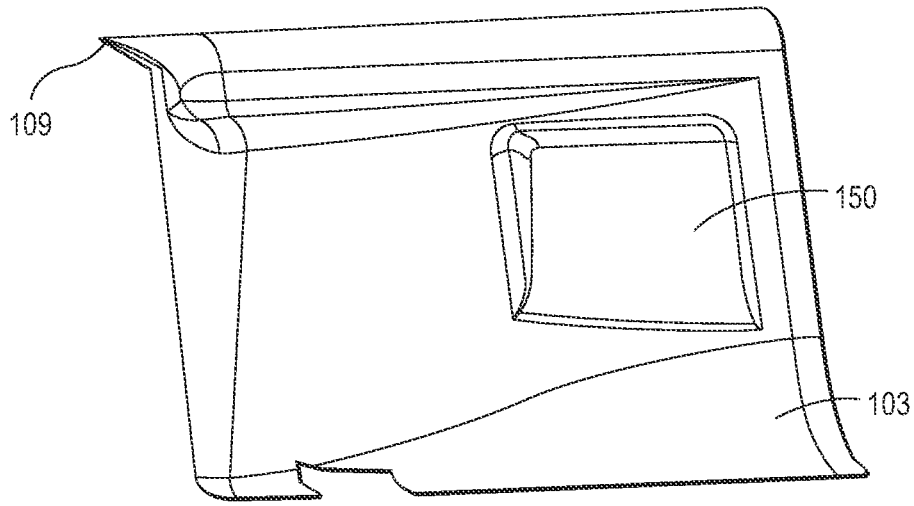
FIG. 16 is a back view of a first portion of a bow.
Figure 17:
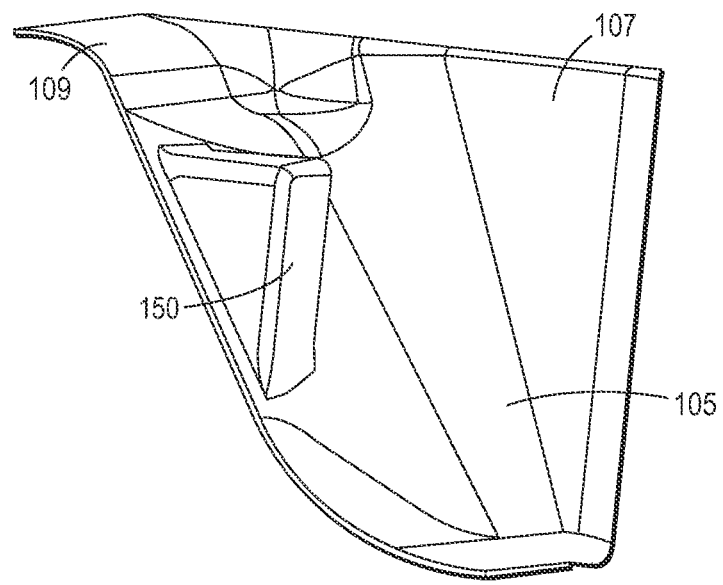
FIG. 17 is a side view of a first portion of a bow.

A material 312 substantially encloses the back unit frames 302 or 304. To secure the back unit 300 to the trailer 108, hinges 314 as shown in FIG. 9, are fixed to the back planar surface of the trailer 106 as well as hinge bolts 316, as shown in FIG. 10, for receiving a first terminal end 318 of each strut 306. One end of each strut 306 includes a pivoting connector 322 arranged to engage one of the hinge bolts 316. It should be appreciated by those having ordinary skill in the art that other connectors and anchors can be used to secure the back unit 300 to the trailer, including but not limited to anchors 350 such as that shown in FIG. 5, swivel joints 352 such as that shown in FIG. 6, connectors 354 such as that shown in FIG. 7, and vertical anchors 356 such as that shown in FIG. 8.

Preferably, the material 312 is flexible and pulled taut around the frame 302 or 304. Although the material 312 is set forth as enclosing the frame 302 or 304, it is understood the material 312 can be connected to the frame 302 or 304 to be within the volume defined by the frame 302 or 304. However, such construction requires more fasteners connecting the material 312 to the frame 302 or 304.

In summary, the drag force reduction system 100 in one configuration comprises a frame 200 having a skin 202, the frame 200 positioned on the undercarriage 106 of a trailer 108. The skin 202 attaches to the frame 200 creating smooth aerodynamic surfaces beneath the trailer. In addition to the undercarriage portion 106 of the system 100, the drag force reduction system 100 also incorporates a quick-deploy and removal pyramidal unit 300 which attaches to the back doors of a vehicle. The frame 200 and skin 202 work together to create a smooth surface, which keeps airflow in contact with the surface of the vehicle and reduces drag forces to improve fuel economy.

The frame 200 allows for rear wheel movement allowing the dolly, which carries the wheels to move for better weight distribution. Further, pressure is reduced by the rear wheels of the trailer improving fuel economy of a truck by 5%, more preferably by 10% and even more preferably by 20%.

Figure 4:
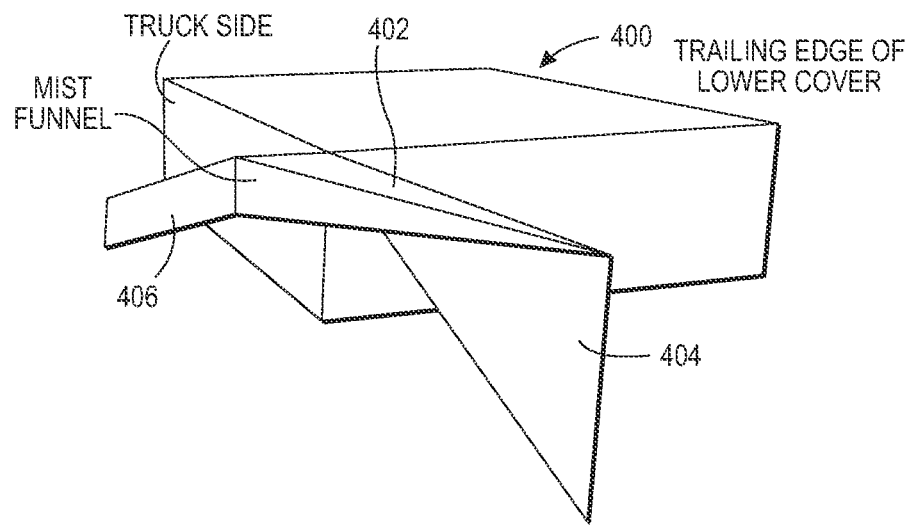
FIG. 4 is a perspective view of a mist funneling system for directing water spray from the wheels of a truck.
Figure 5:
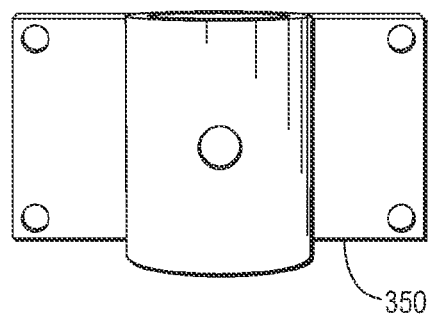
FIG. 5 is a front view of an anchor for the frame of the lower unit.
Figure 6:
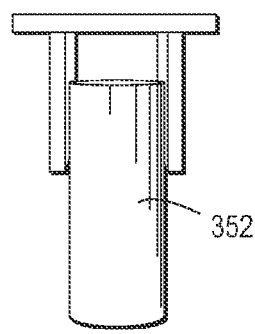
FIG. 6 is a front view of a swivel joint for the frame of the lower frame.
Figure 7:
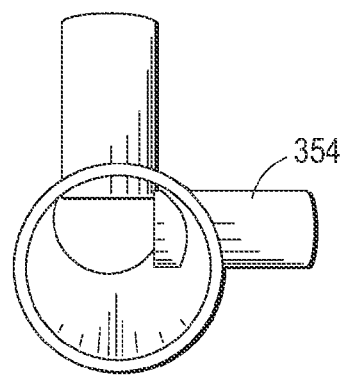
FIG. 7 is a front view of a connector for the frame of the lower frame.
Figure 8:
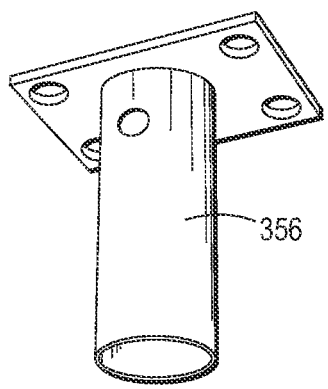
FIG. 8 is a perspective view of another configuration of the vertical anchor.

The drag force reduction system may further comprise a vehicle water spray reduction funnel 400 shown in FIG. 4. The funnel 400 may include an aerodynamically shaped base 402 coupled to the underside of a vehicle and positioned proximate a wheel of a vehicle, a side panel 404 connected to a side of the base 402 and directing spray towards the base 402, and a back panel 406 directing water spray downwardly and behind the wheel. The side panel 404 may be triangular. The base 402 pivots in response to a force of the water spray.

This invention being thus described, it will be obvious that the same may be varied in many ways. Such variations are not to be regarded as a departure from the spirit and scope of the invention and all such modifications are intended to be included within the scope of the following claims.

The invention claimed is:

1. A fairing assembly for a trailer having a wheel set and a hitch, the fairing assembly comprising:
   (a) a fairing connected to an underside of the trailer intermediate the hitch and the wheel set, the fairing including (i) a pair of opposing lateral surfaces separated by a distance, (ii) a bottom surface spaced from the underside of the trailer, and (ii) a leading surface, the leading surface substantially spanning the distance, wherein the leading surface includes an intake opening, wherein at least one of the bottom surface or the lateral surfaces includes an exit opening, and a duct fluidly connects the intake opening and the exit opening having a predetermined flow path.

2. The fairing assembly of claim 1, wherein the bottom surface spans an area bounded by the lateral surfaces and the leading surface and includes an angled portion extending away from the underside of the trailer.

3. The fairing assembly of claim 1, wherein the lateral surfaces are planar.

4. The fairing assembly of claim 1, wherein the fairing includes a trailing surface, the trailing surface substantially spanning the distance.

5. The fairing assembly of claim 1, wherein the trailing surface is spaced from the wheel set and lowers the drag coefficient of the fairing assembly.

6. The fairing assembly of claim 4, wherein the trailing surface extends from a first position spaced from the underside of the trailer to a second position adjacent the underside of the trailer, the second position being intermediate the wheel set and the first position.

7. The fairing assembly of claim 6, wherein the trailing surface is spaced from the underside of the trailer.

8. The fairing assembly of claim 1, wherein the leading surface defines a bow.

9. The fairing assembly of claim 8, wherein the bow has a shape selected from the group consisting of flat, curved, arched, angled, tumblehomed, plumed, raked, and spooned.

10. The fairing assembly of claim 1, further comprising:
    (b) a trailing surface, the leading surface, the lateral surfaces, the bottom surface and the trailing surface substantially enclosing a volume beneath the trailer.

11. The fairing assembly of claim 1, further comprising:
    (b) a plurality of lighting elements disposed along at least a portion of a perimeter edge of the lateral surfaces.

12. The fairing assembly of claim 1, wherein the distance is substantially equal to the width of the trailer.

13. The fairing assembly of claim 10 further comprising:
    (b) a back unit for mounting to a back planar surface of the trailer, the back unit having (i) first and second frames formed of a plurality of struts, each frame having a base portion arranged proximate the back planar surface of the trailer and a protruding portion of the frame arranged distal to the back planar surface of the trailer, wherein the base portion of the first frame circumscribes a first portion of the back planar surface of the trailer and wherein the base portion of the second frame circumscribes a second portion of the back planar surface of the trailer; and (ii) at least one skin substantially enclosing the first and second frames.

14. The fairing assembly of claim 8, wherein the bow further comprises the intake opening.

15. The fairing assembly of claim 14, wherein the at least one flow path includes at least one venting duct extending from the intake opening to the at least one exit-opening.

16. The fairing assembly of claim 14, wherein the at least one exit-opening has a cross-sectional area less than a cross-sectional area of the intake opening.

17. The fairing assembly of claim 14, wherein the at least one ex opening has a cross-sectional area equal to a cross-sectional area of the intake opening.

18. The fairing assembly of claim 1, wherein the leading surface includes first and second venting ducts extending from the intake opening in the leading surface to the exit-opening in each corresponding lateral surface, wherein air exiting the exit-openings reduces a pressure on an outside surface of the fairing.

19. The fairing assembly of claim 1, wherein the leading surface includes first and second venting ducts extending from the intake opening in the leading surface to a corresponding exit-opening in the bottom surface, wherein air exiting the exit-openings reduces a pressure on at least one of i) the bottom surface of the fairing; and ii) the lateral surface.

* * * * *